ROBERTS & COX.
Thrashing Machine.

No. 14,517.   Patented March 25, 1856.

UNITED STATES PATENT OFFICE.

CYRUS ROBERTS AND JNO. COX, OF NEW HOPE, PENNSYLVANIA.

GRAIN-SEPARATOR.

Specification forming part of Letters Patent No. 14,517, dated March 25, 1856; Reissued June 15, 1869, No. 3,502.

*To all whom it may concern:*

Be it known that we, CYRUS ROBERTS and JOHN COX, of New Hope, in the county of Bucks and State of Pennsylvania, have invented certain new and useful Improvements in Grain Separators and Cleaners, of which the following is a full, clear, and exact description, reference being had to the accompanying drawing of the same, making part of this specification, and in which—

Figure 1:
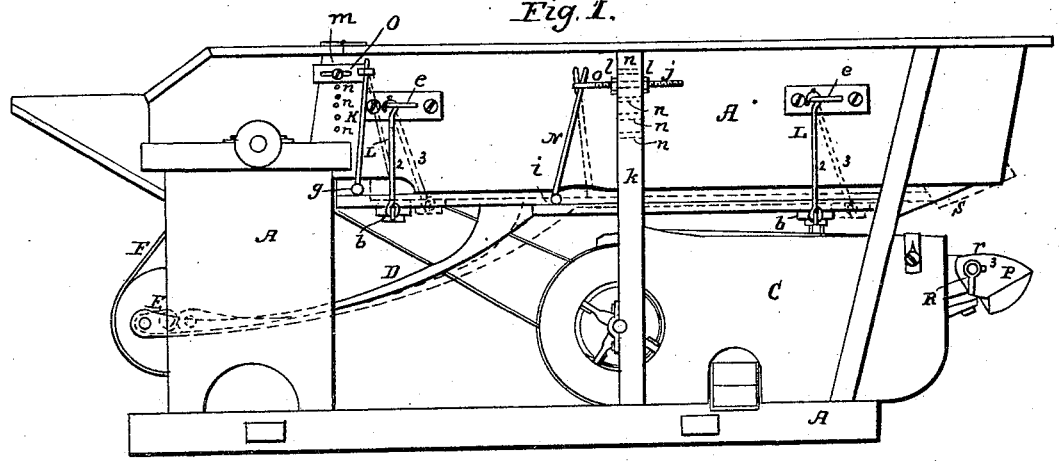
Figure 2:
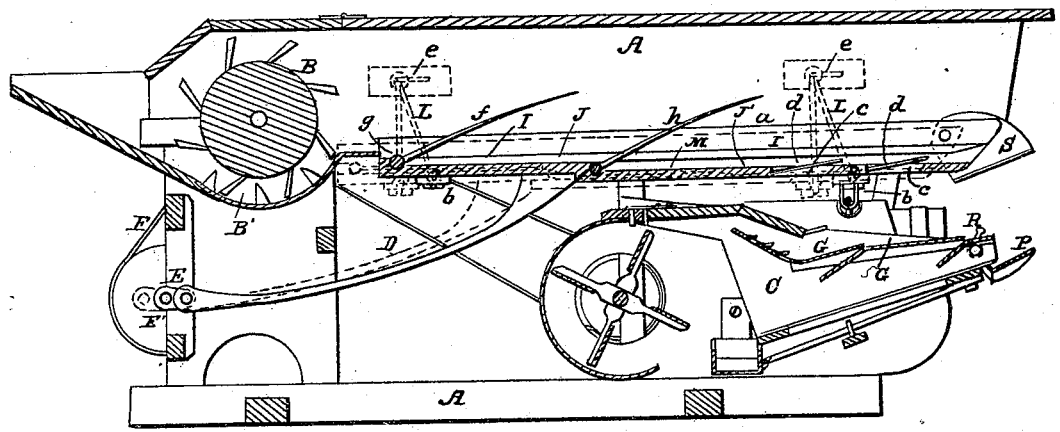
Figure 3:
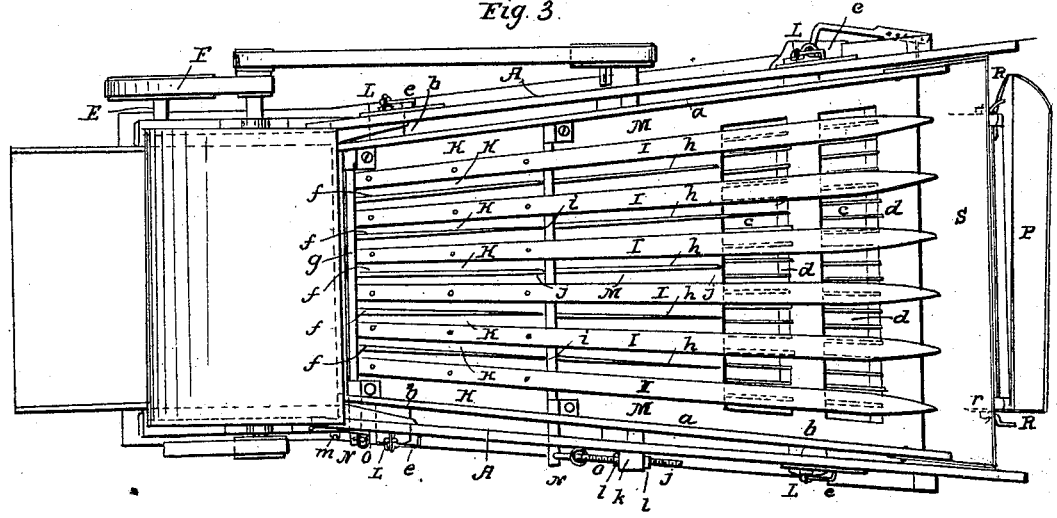

Figure 1, represents a side elevation of a machine embracing our improvement; Fig. 2, represents a vertical longitudinal section of the same, and Fig. 3 represents a top view with the cover of the conveyer removed to show the diverging ridges, and fingers in the bottom thereof.

There are several points or features in our invention which may be briefly noticed under the following heads, viz:—First. A series of diverging bars or ridges in the bottom of the conveyer to attenuate, by spreading laterally as it is moved forward, the comparatively thick stream or sheet of mixed straw, chaff, and grain issuing from the thresher, which attenuation greatly facilitates the separation of the grain from the straw and chaff. Second, making the rear end of the conveyer on which the grain, straw, and chaff are received from the thresher, with a solid ridged bottom, the ridges whereof diverging as they extend forward to form channels that widen as they recede from the thresher for the purpose of feeding the grain and chaff more evenly into the winnowing apparatus. Third, the arrangement and operation of vibrating shaking fingers in a swinging conveyer in such a manner that they will rise on the forward swing of the latter, and lift and shake the straw, while it is thrown forward, thereby thoroughly sifting the wheat out of the straw, and at the same time increasing the speed with which the straw is carried forward. Fourth, the arrangement of shaking fingers beneath the diverging carrying bars, in a recess in the bottom of the conveyer, in such manner, as to allow the straw and grain to pass freely along the carrying bars. Fifth, the employment of adjustable guides in combination with arms which vibrate the shaking fingers, for the purpose of varying the upward throw of the fingers while the limit of the descent of the same shall remain unchanged. Sixth, the diverging bars extending over the recess for the shaking fingers, to sustain the straw and carry it off, while they permit the grain to drop into the bottom of the recess, whence it is discharged into the winnowing apparatus. Further, this arrangement of the carrying bars over the recess permits the front shaking fingers to be entirely withdrawn from the straw on the back swing of the conveyer, so that in rising when the conveyer swings forward they may strike the straw with a blow which facilitates the separation of the grain therefrom. Seventh, facilitating the feed of the threshed matter through the conveyer, by suspending the latter in such manner, that it shall vibrate only on one side of a vertical line drawn from the centers of motion of the radius bars on which it swings in this way overcoming the tendency of the straw to feed backward during the back swing of the conveyer. Eighth, combining an adjustable tail-spout with the winnower, for the purpose of catching many of the light heads which would otherwise be blown off with the chaff especially when the grain is shriveled or light.

In the accompanying drawing the frame (A) is represented as suitably constructed to receive and support at one end a threshing cylinder (B) and its concave (B'), at the other a winnowing apparatus (C) and between these a conveyer and separator. The conveyer derives a reciprocating motion through a rod (D) from a crank (E) on a shaft (E') beneath the thresher. This shaft receives its motion through a band (F) from the shaft of the threshing cylinder (B).

The conveyer unlike those heretofore constructed is made considerably wider at its front or discharging, than at its rear or receiving end. It is open at both ends, but fitted with sides (a) of the proper height to keep the straw and grain from falling over laterally, and is suspended by means of two radius bars (L) on each side, to the sides of the frame. The rear part of the bottom of the conveyer is closed, but its front portion over the winnower, has two openings (c) each covered with a grating (d) through which the grain and chaff drops onto the riddles (G). The bottom although closed and horizontal, is not all in the same plane, but, about two thirds of its length at the forward end is sunk or depressed below the level of the rear portion to form a recess (M), the purpose of which will presently be more fully described. A number of bars (I) of about the same length as the conveyer, are secured by their rear ends to the surface of the back and more elevated portion (J) of the bottom, and extend forward horizontally above the depressed portion (J') of the bottom. The bars (I) are equidistant but not parallel to each other, and they diverge from their rear toward their front ends radiating from the same center as the sides (a) of the conveyer. This arrangement of diverging bars causes the straw to separate and spread out laterally while it is carried forward, and it is plain, that this action by opening the straw can not fail greatly to facilitate the separation of the grain therefrom. In the use of parallel bars in the bottom of the conveyer as described in a patent heretofore granted to us, we discovered that the straw constantly tended to pile up in its passage through the conveyer, so as to prevent a thorough separation of the grain therefrom.

The elevated portion (J) of the bottom, with the bars (I) attached thereto forms a solid surface having a series of narrow ridges and wide grooves or channels (K) running lengthwise of the separator, the front ends of the grooves or channels being the widest. If these channels were straight and parallel to each other, the chaff and grain would have a tendency to bind and lodge in them until a large quantity had accumulated which would be then suddenly discharged into the winnower and clog the riddle, thereby imperfectly cleaning the grain and causing much of it to be wasted. This separator is of the vibrating variety, which carries the straw forward by a series of impulses, the intervals between the impulses which are given by the forward swing of the separator, being of sufficient duration for the separator to swing back to renew the impulse. It is obvious that each forward impulse will spread the grain laterally in the channels as they widen and discharge it into the winnower in a broad thin sheet which is most favorable for the action of the riddles and blast while the straw passes freely along the ridges.

The radius bars (L) by which the conveyer is suspended, are connected at their lower ends to transverse bars (b) near the ends of the conveyer, and at their upper ends to staples (e) on the sides of the frame (A), these connections form the hinges upon which the conveyer swings. The conveyer thus suspended maintains a horizontal position while vibrating by reason of the radius bars being of equal length and describing equal arcs. The arcs however, which the bars (L) describe, do not extend equally on both sides of a vertical line drawn from their centers of motion, but only on one side thereof as illustrated by Fig. 1, in which the black lines (2) show the bars (L) in a vertical position which is the backward extremity of their range of motion, and the dotted lines (3) show the forward extremity of their range of motion. The centers of motion of the radius bars (L) must be so situated relatively to the crank (E) that the whole stroke of the latter, will be spent in vibrating the conveyer as above described. The object of this arrangement is to cause the conveyer to ascend on its forward and descend on its backward swing to throw the straw forward and upward as it advances without carrying the straw back with it as it recedes, which it would tend to do if so hung as to vibrate on both sides of the vertical lines drawn through the points of suspension. In the bottom of the conveyer are arranged two sets of vibrating fingers, the object of which is to throw the threshed matter up to shake it. But there is a peculiarity in this operation, which consists in causing them to rise on the advance movement of the conveyer so that, while the straw is receiving a forward impulse along the ridges or bars the fingers will at the same time throw up and shake the straw, the two motions thus coöperating with the spreading caused by the divergence of the bars, will agitate the straw so thoroughly as to leave little, if any, loose grain remaining in it. One set of these fingers (f) are placed at the rear extremity of the conveyer in a stock or head (g) in which they are arranged like the teeth of a rake. The fingers extend forward between the ridges in the middle of the diverging channels, while the head (g) turns on journals confined in boxes on each side of the bottom. The other set of fingers (h) are arranged farther forward in the bottom with their stock (i) lying snugly against the rear side of the recess (M). The fingers extend forward between the ridges to the opening (c). This second set of fingers is necessary to prevent the opening from choking; but were it not that they are arranged in the recess (M), they could not be used without obstructing the passage of the grain and straw. Another advantage arising from this recess (M), is, that it is so arranged as to receive the several currents of grain and chaff directly from the diverging channels, and distribute the same in a continuous sheet into the winnower.

One end of the head of each set of fingers projects through the side of the conveyer, and each of these projecting ends has an arm (N) rising therefrom which is connected with an adjustable guide (o) secured to the side of the frame. The arms (N) are set in such a position that when the conveyer is at the limit of its receding motion, the fingers will lie parallel to the bottom of the separator, and when the conveyer advances to feed the straw, the fingers will rise. The upward range or throw of the fingers is governed by the position of the adjustable guides (o and o′), and it is found important sometimes to increase, and at other times to diminish this throw, to adapt it to the condition of the straw, which if short and dry, will not require to be lifted as high as if it be long and damp. The variations in the throw of the fingers are produced by passing the arms (N) through eyes in the adjustable guides (o and o′), which eyes form fulcra or fixed points which retain that portion of the arm (N) which the eye encircles fixed, while its lower end, and the rake head, are free to be vibrated with the conveyer, this rocks the head of the fingers to lift and depress the latter. It is only necessary therefore, if it is desired to increase the throw of the fingers, to adjust the fulcra or guide through which the arms (N) vibrate, nearer to the finger heads, which will so change the fulcra of the arms relatively to the centers of oscillation of the finger heads, as to produce the desired increase in the lift of the fingers. The converse of this adjustment will of course diminish the lift of the fingers. The two guides (o) and (o′) as represented in the drawing are of different forms one (o) has its eye formed in the end of a screw bolt (j) which passes through a post (k) and is adjusted by means of nuts (l). The other (o′) has an eye formed in a bracket which by means of a set screw (m) passing through a slot fastens it to the surface of a board in the side of the frame.

To cause the fingers to descend always to the same position and at the same time to raise to a variable height, the guide in addition to the horizontal adjustment just described, must be adjusted vertically by shifting it in one of the holes (n) so as to bring the eye or fulcrum of the arm (N) nearer to, or farther from the axis of oscillation of the fingers, and horizontally by shifting them so as to set the eye to the right or left as required. The form of the guides or their manner of adjustment is immaterial so that they are adapted to the frame and adjusted with facility both vertically and horizontally.

The winnower is of the usual construction, except that it is provided with an adjustable tail-spout (P) for the purpose of catching the unthreshed heads and white caps and delivering them into a suitable receiver at the side of the machine instead of discharging them as heretofore among the chaff and straw. This tail-spout (P) is placed across the shoe in front of the riddles, and is secured to the side of the shoe by means of clamp-screws (R). Its bottom declines toward one side of the winnower sufficiently to cause the heads to run out freely. The upper edge of its front and outer side is horizontal and parallel to its axis of motion so that, in whatever position it may be adjusted, it will maintain the same level in relation to the riddles throughout its entire length. The upper edge of the inner side of the spout is parallel to the outerside of the riddle and fits closely thereto. The upper end of the spout is closed and the lug (r) by which it is secured to the shoe has a slot (s) through which the shank of the clamp screw (R) passes, and by which this end of the spout may be extended from or set nearer to the shoe, while at the same time the spout may be adjusted in the arc of a circle, so as to bring its front side either above or below the plane of the riddle. The unthreshed heads do not pass through the openings (c) but off at the end of the conveyer and are directed upon the riddle by means of an inclined plate (S), and while the chaff and straw will be blown off the heads and white caps will be caught by the spout, and thus separated from the chaff and saved.

What we claim as our invention and desire to secure by Letters Patent, is—

1. The method of facilitating the separation of the grain from the straw, by means of diverging bars, substantially as herein described.

2. Constructing the rear portion of the conveyer with a solid ridged bottom, in such manner as to form a series of diverging channels to spread the grain preparatory to delivering it to the winnower as herein set forth.

3. The employment of shaking fingers, arranged and operating in such manner that they will rise on the forward movement of the conveyer, and thus lift and shake the straw as it is thrown forward in combination with the carrying bars whereby certain advantages are attained as herein set forth.

4. The arrangement of shaking fingers in a recess (M) in the bottom of the conveyer in such manner that they can be alternately protruded above and retracted below the carrying bars to shake the straw thorughly and at the same time not interfere with its conveyance, as herein described.

5. The adjustable turning tail-spout (P) arranged substantially in the manner and for the purposes herein set forth.

In testimony whereof, we have hereunto subscribed our names.

CYRUS ROBERTS.
JOHN COX.

In presence of—
F. G. FONTAINE,
A. E. H. JOHNSON.

[FIRST PRINTED 1912.]